US012162262B2

(12) United States Patent
Jiang et al.

(10) Patent No.: US 12,162,262 B2
(45) Date of Patent: Dec. 10, 2024

(54) CELLULOSE TRIACETATE (TAC) PRIMER COATING WITH IMPROVED ADHESION

(71) Applicant: ESSILOR INTERNATIONAL, Charenton-le-Pont (FR)

(72) Inventors: Peiqi Jiang, Dallas, TX (US); Christopher Thai, Dallas, TX (US); Marvin Pounders, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 915 days.

(21) Appl. No.: 16/334,656

(22) PCT Filed: Sep. 19, 2016

(86) PCT No.: PCT/US2016/052513
§ 371 (c)(1),
(2) Date: Mar. 19, 2019

(87) PCT Pub. No.: WO2018/052454
PCT Pub. Date: Mar. 22, 2018

(65) Prior Publication Data
US 2020/0376804 A1    Dec. 3, 2020

(51) Int. Cl.
*B32B 7/12* (2006.01)
*B32B 23/08* (2006.01)
*B32B 37/12* (2006.01)
*C08F 265/06* (2006.01)
*C08J 5/12* (2006.01)
*C08J 7/043* (2020.01)
(Continued)

(52) U.S. Cl.
CPC ............ *B32B 7/12* (2013.01); *B32B 23/08* (2013.01); *B32B 37/12* (2013.01); *C08F 265/06* (2013.01);
(Continued)

(58) Field of Classification Search
CPC .......... B32B 7/12; B32B 23/08; B32B 37/12; B32B 2037/1269; B32B 2305/72;
(Continued)

(56) References Cited

U.S. PATENT DOCUMENTS 5,015,523 A * 5/1991 Kawashima ....... B29D 11/0073
428/447
5,384,341 A * 1/1995 Itagaki .................. C08F 299/00
522/182
(Continued)

FOREIGN PATENT DOCUMENTS

CN        102639315        8/2012
CN        104797667        7/2015
(Continued)

OTHER PUBLICATIONS

JP-2008255228-A Machine Translation (Year: 2008).*
(Continued)

*Primary Examiner* — Michael N Orlando
*Assistant Examiner* — Abhishek A Patwardhan
(74) *Attorney, Agent, or Firm* — Norton Rose Fulbright US LLP

(57) ABSTRACT

An enhanced primer formulation that may be used in a variety of lens and film laminate applications is disclosed herein. The enhanced primer formulation may be used to enhance adhesion between a film or laminate and a polymerizable or polymerized material.

5 Claims, 1 Drawing Sheet

(51) Int. Cl.
*C09D 4/06* (2006.01)
*C09D 5/00* (2006.01)
*G02B 5/30* (2006.01)

(52) U.S. Cl.
CPC ............... *C08J 5/124* (2013.01); *C08J 7/043* (2020.01); *C09D 4/06* (2013.01); *C09D 5/002* (2013.01); *G02B 5/305* (2013.01); *B32B 2037/1269* (2013.01); *B32B 2305/72* (2013.01); *B32B 2307/42* (2013.01); *B32B 2551/00* (2013.01); *C08J 2301/12* (2013.01)

(58) Field of Classification Search
CPC ............ B32B 2307/42; B32B 2551/00; B32B 2307/40; B32B 23/04; B32B 27/08; B32B 27/285; B32B 27/308; B32B 27/34; B32B 27/36; B32B 27/365; C08F 265/06; C08J 5/124; C08J 7/043; C08J 2301/12; C09D 4/06; C09D 5/002; G02B 5/305

See application file for complete search history.

(56) References Cited

U.S. PATENT DOCUMENTS

| | | | | |
|---|---|---|---|---|
| 5,725,960 | A | * | 3/1998 | Konishi ................ C08J 7/046 428/522 |
| 6,235,396 | B1 | | 5/2001 | Dixon |
| 2005/0168690 | A1 | * | 8/2005 | Kawai ..................... G02B 5/23 351/159.6 |
| 2010/0092693 | A1 | * | 4/2010 | Park ..................... C08F 265/04 427/535 |
| 2012/0236255 | A1 | * | 9/2012 | Jiang .................... G02B 5/3033 351/159.61 |

FOREIGN PATENT DOCUMENTS

| | | | |
|---|---|---|---|
| CN | 105764688 | | 7/2016 |
| JP | 2005/202389 | | 7/2005 |
| JP | 2008/150484 | | 7/2008 |
| JP | 2008-255228 | | 10/2008 |
| JP | 2008255228 A | * | 10/2008 |
| TW | 200838963 | | 10/2008 |
| WO | WO 2011/053329 | | 5/2011 |

OTHER PUBLICATIONS

International Search Report and Written Opinion issued in International Patent Application No. PCT/US2016/052513, dated Apr. 6, 2017.

Office Action Issued in Corresponding Chinese Patent Application No. 201680089383.1, dated Aug. 26, 2020.

* cited by examiner

CELLULOSE TRIACETATE (TAC) PRIMER COATING WITH IMPROVED ADHESION

CROSS-REFERENCE TO RELATED APPLICATIONS

This application is a national phase application under 35 U.S.C. § 371 of International Application No. PCT/US2016/052513, filed 19 Sep. 2016, the entire contents of which is specifically incorporated by reference herein without disclaimer.

FIELD OF THE INVENTION

The invention relates to the field of ophthalmic lenses, including polarized and/or photochromic ophthalmic lenses for spectacles and sunglasses.

BACKGROUND

Cellulose triacetate (TAC) polarizing films are widely used in sun glass lens applications, owing to their exceptional optical and mechanical properties. In one particular application, TAC polarizing films are used in allyl diglycol carbonate (CR-39) lens casting. A TAC polarizing laminate is placed within allyl diglycol carbonate monomer, and the monomer is then polymerized in order to provide a solid polarizing lens with polarizing laminate embedded inside the lens. The embedded polarizing laminate provides polarizing function and is protected by the surrounding polymerized material.

Despite the fact that the laminate is embedded within the polymerized material, the potential for delamination still exists. Rx lab processing conditions where best lens practices, including lens generation, fining, and polishing, are employed may cause embedded laminate delamination. Extreme temperature and high humidity conditions may also cause delamination of an embedded lens.

In order to increase adhesion of an embedded laminate, a primer coating may be pre-applied onto the laminate surface prior to lens casting. The primer increases the adhesive strength between the laminate and surrounding material, however, the laminate is still subject to delamination under sub-optimal primer conditions. Delamination may occur if the primer is too soft, which may result from low crosslinking in the polymer network. Delamination may also occur if the primer is too rigid, or if the primer thickness is too high. Despite advancements in the field of polarizing film adhesive primers, the potential for delamination still exists. There is a need for an enhanced primer formulation to increase adhesion between a laminate and polymerizable material in order to reduce or eliminate the potential for delamination.

SUMMARY

Disclosed herein is a primer composition with significantly higher adhesive strength than traditional, commercially-available primers. Applicants have found that the inclusion of a crosslinking agent in a primer composition results in a primer formulation with significantly improved adhesive strength. The primer formulation disclosed herein may be used for adhesion between layers in a film laminate or adhesion of a laminate to a polymerizable material. In some aspects, the primer is used to increase adhesion of a laminate in a cast polymerized composition. Without wishing to be bound by theory, it is believed that the crosslinking agent increases primer component cohesion, leading to improved film layer adhesion. The crosslinking agent may also link primer components to a polymerizable material, thereby increasing adhesion of a film to the polymerized material. The polymerizable material may be a casting resin monomer or a reactive adhesive.

In some embodiments, the primer composition is employed to adhere a TAC film to a polymerized material. In other embodiments, the primer composition is employed to adhere a TAC film to a polymerizable material. In further embodiments, the primer composition is employed to adhere a TAC laminate to a polymerized material. In other embodiments, the primer composition is employed to adhere a TAC laminate to a polymrizable material. In some embodiments, the TAC film is a clear optical film or an optical functional film.

Examples of optical functional films include polarizing film and photochromic film. In some embodiments, the TAC laminate is a TAC-PVA-TAC polarizing laminate. In some embodiments, the TAC laminate is a photochromic laminate. In some embodiments, the optical functional film is a photochromic film.

In some embodiments, the primer composition is employed to adhere a film onto a polymerized material surface or to provide embedded adherence within a cast material. In some aspects, the polymerized material is polyether block amide film (Pebax film), polycarbonate film, polymethyl methacrylate film, polyamide film (nylon film), polyester film (PET), cellulose acetate butyrate (CAB) film, or a composite film comprising any combination of the preceding. In some embodiments, the polymerizable material is a casting resin monomer such as allyl diglycol carbonate, middle index acrylic, amine, or styrene monomer, or epithio-urethane monomer. In some embodiments, the polymerizable material is a reactive adhesive selected from the group consisting of UV acrylic adhesive, polyurethane adhesive, epoxy adhesive, amine adhesive, or two-component polyurethane or epoxy adhesives.

In some aspects, the primer composition comprises at least one acrylic polymer resin, at least one reactive acrylic oligomer, at least one UV or thermal initiator, at least one crosslinking agent, and a solvent. In some aspects, the at least one acrylic polymer resin is present in an amount ranging from 10% by weight to 30% by weight of the primer composition. In some embodiments, the at least one reactive acrylic oligomer is present in an amount ranging from 10% by weight to 30% by weight of the primer composition. In some aspects, the at least one UV or thermal initiator is present in an amount ranging from 1% by weight to 5% by weight of the primer composition. In some embodiments, the at least one crosslinking agent is present in an amount ranging from 1% by weight to 25% by weight of the primer composition. In some embodiments, the solvent is present in an amount ranging from 50% by weight to 90% by weight of the primer composition. In some embodiments, the acrylic polymer has a molecular weight between about 10,000 and 100,000 g/mol. In some embodiments, the reactive acrylic oligomer has a molecular weight between about 1,000 and 50,000 g/mol.

In some aspects, the crosslinking agent comprises at least two reactive functional groups per molecule. The at least two reactive functional groups may be independently selected from the group consisting of acrylic, acrylate, allyl, vinyl, propargyl, isocyanate, amine, and epoxy. In further embodiments, the crosslinking agent is a multifunctional acrylate. In specific aspects, the multifunctional acrylate is pentaerythritol triacrylate. In some embodiments, the acrylic polymer resin is a methacrylate copolymer. In some aspects, the methacrylic polymer contains an acid number from 10 to 80 in the copolymer. An "acid number" is the mass of potassium hydroxide (KOH) in milligrams that is required to neutralize one gram of chemical substance.

In some embodiments, the primer composition solvent is a ketone solvent, an acetate solvent, methylene chloride, or a combination thereof. The ketone solvent may be selected from the group consisting of acetone, methyl ethyl ketone cyclopentanone cyclohexanone, or any combination thereof. In some aspects, the acetate solvent is ethyl acetate. In some embodiments, the hardness of the primer is between 9B and 6B by pencil hardness test. In some aspects, the thickness of the primer is between about 1 and about 4 μm.

Any embodiment of any of the disclosed compositions and/or methods can consist of or consist essentially of— rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

"Analogue" and "analog," when referring to a compound, refers to a modified compound wherein one or more atoms have been substituted by other atoms, or wherein one or more atoms have been deleted from the compound, or wherein one or more atoms have been added to the compound, or any combination of such modifications. Such addition, deletion or substitution of atoms can take place at any point, or multiple points, along the primary structure comprising the compound.

"Derivative," in relation to a parent compound, refers to a chemically modified parent compound or an analogue thereof, wherein at least one substituent is not present in the parent compound or an analogue thereof. One such non-limiting example is a parent compound which has been covalently modified. Typical modifications are amides, carbohydrates, alkyl groups, acyl groups, esters, pegylations and the like.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Figure 1:
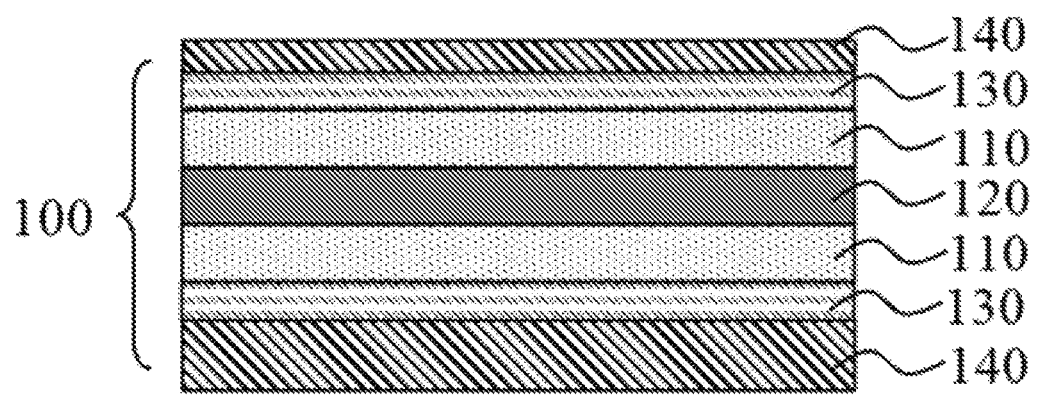
FIG. 1 is a side view of a cast polarizing lens 100, where 110 is a TAC film, 120 is a polarizing PVA film, 130 is a primer containing crosslink agent, 140 is CR-39 resin.
Figure 2:
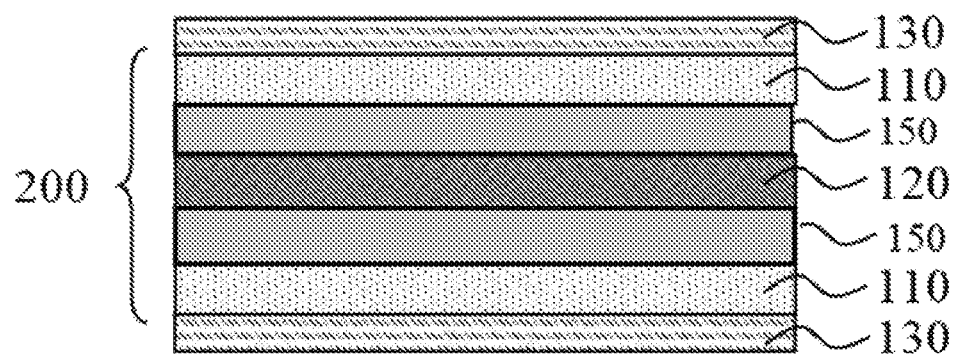
FIG. 2 is a side view of a polarizing photochromic laminate 200, where 110 is a TAC film, 120 is a polarizing photochromic Pebax film, 130 is a primer containing crosslink agent, 150 is a reactive adhesive.

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Several primer examples (solutions) and comparative primer examples (solutions) were produced. Example variables include presence and absence of crosslinking monomers and different primer thicknesses. The examples and results are described below.

Surfacing And Edging Test (Set) for Cast Delamination

In the experiments described below, the surfacing and edging test is employed to induce stress potentially leading to delamination in various lens samples.

The surfacing and edging test is applicable to all ophthalmic lenses with embedded or surface mounted film. Lenses may be coated or uncoated, and may or may not include at least one of a hard coat, an antireflective component, a finishing vacuum coating, and a top coat. The observed failure rates provide an indication of the risk of failures during lens processing.

Lenses are generated with a power offset. The lenses are then fined with increased pressure to exert mechanical forces on lens edges, resulting in high stress at the interfaces, potentially weakening the adhesion. Polishing is performed in a typical manner known to one skilled in the art. Edging is performed with the most aggressive setting on a typical edger.

The test results outlined below were performed on polarized CR39 single vision lenses. The lenses were processed to +0.50 power with target thickness 2.8mm. Lenses were blocked with metal alloy at an offset 0.1 diopter between the generator and the fining back curve. The fining pressure was raised to the safe maximum limits of the equipment (25 PSI, Gerber-Coburn). Polishing was performed according to standard operating procedures. Edging was performed on a fast-cycle edger which is selected to be especially aggressive (Triumph edger).

Inspection

A visual inspection for any anomalies resulting from any of the preceding steps is performed for each lens. Lenses are visually inspected for delamination. Any delamination is interpreted as a lens failure.

Peel Force Measurement for Laminate Adhesion

The peel force value between TAC and another functional film is measured by Mark-10 equipment. A film width of 25 mm is tested in an anhydrous environment. The TAC film is separated firstly from the TAC-Pebax-TAC laminate interface and then peeled at 180° T-peel with a peeling speed of 1.5 mm/min. The peel force value (Newton) is recorded when it reaches a certain stable level, usually after peeled above 20 mm. One of skill in the art would consider that the value of the peel force is sufficient, i.e., the film does not delaminate during further surfacing and edging process when the value is above 10 N/inch.

EXAMPLE 1

Primer Formulations and Casting

Step One: Primer Formulations and Coating on TAC Polar Laminate

Comparative primer solutions consisted of a base primer or a base primer in combination with a crosslinking agent, with the base primer solution serving as a control. The base primer formulation included a an acrylic polymer resin (MW ~10,000 to ~100,000), a reactive acrylic oligomer, and a UV or thermal initiator. One exemplary, non-limiting crosslinking agent employed in the examples is pentaerythrityl triacrylate. However, other compounds which function to crosslinking base primer components are also effective. A solvent was used to reduce the solid content of the base and modified primers.

The adhesive strength of the primer formulations was examined using a TAC polar laminate cast in a polymerizable meterial. The laminate used for the experiments below was a TAC-PVA-TAC polar laminate.

Base and modified primers were coated on both sides of the TAC laminate by a Meyer Rod coating machine with different rod sizes (numbers) at a coating speed of about 4 mm/second. The coatings were then cured using a Fusion conveyer UV system with an average UV intensity of 600 mJ/cm$^2$ to give a series of TAC polarizing laminate films. Each TAC polar laminate film included either a cured base primer coating (control) or a cured, modified primer coating (comparative primer examples).

Step Two: Polar Laminate Forming and Casting With Polymerizabk Material

Primer-coated TAC polar laminates were thermally formed using LEMA forming equipment to achieve a 4 or 6 base curve for polarizing lens casting. The curved TAC polar laminate wafers were then placed into a glass mold assembly for casting with a polymerizable material. The examples below employed allyl diglycol carbonate (CR-39) as the polymerizable material. After casting and mold disassembly, a series of TAC polar CR-39 semi-finished (SF) lenses were obtained.

Step Three: Cast TAC Polarizing CR-39—Lens SET Evaluation

The SET results are summarized in Table 1 below. The base primer control lens (Primer #1, supplied by Onbitt Inc) became delaminated during SET test. Two base primer+ crosslinker examples (Primers #3 and #4) also became delaminated. These examples included 30% and 10% crosslinker, respectively. Primer #2 (10% crosslinker) did not become delaminated and was coated using a different rod number from Primer #4. Primers #5 and #6 included 5% and 3% crosslinker, respectively, and did not become delaminated. These results show that the crosslinker improves the adhesive strength of the primer. The high crosslinking concentration (30%) resulted in a rigid primer which reduced the adhesion level between TAC and cast resin. When the primer was applied in a thickness greater than 5 μm, the adhesion level was sub-optimal. The results demonstrate that there is an inverse correlation between crosslinker concentration and adhesive strength, as lower crosslinker concentrations resulted in improved adhesion, and that primer thickness should be maintained below a certain value.

TABLE 1

SET Results

| Primer # | Primer Formulation | Primary Primer Component | CA Amount (%) | Rod # | X-Hatch Adhesion | Pencil Hardness | Primer Thickness After Casting in CR-39 | SET Results |
|---|---|---|---|---|---|---|---|---|
| 1 | Base (control) | PU Acrylate | 0% | 3.5 | Moderate (2-5) | <<9B | 2-3 μm | Delaminated |
| 2 | Base + CA | PU Acrylate + CA | 10% | 3.5 | Moderate (2-5) | 6B-9B | 2-3 μm | No Delamination |
| 3 | Base + CA | PU Acrylate + CA | 30% | 3.5 | Poor (>5) | ~HB | 2-3 μm | Delaminated |
| 4 | Base + CA | PU Acrylate + CA | 10% | 6 | Moderate (2-5) | 6B-9B | 5-6 μm | Delaminated |

TABLE 1-continued

SET Results

| Primer # | Primer Formulation | Primary Primer Component | CA Amount (%) | Rod # | X-Hatch Adhesion | Pencil Hardness | Primer Thickness After Casting in CR-39 | SET Results |
|---|---|---|---|---|---|---|---|---|
| 5 | Base + CA + additional solvent | PU Acrylate + CA | 5% | 3.5 | Good (0-1) | 6B-9B | 1-2 μm | No Delamination |
| 6 | Base + CA + additional solvent | PU Acrylate + CA | 3% | 3.5 | Good (0-1) | 6B-9B | 1-2 μm | No Delamination |

CA = crosslinking agent (pentaerythritol triacrylate); all examples were subjected to rod coating; additional solvent = ethyl acetate.

EXAMPLE 2

Primer Formulations for TAC Film Laminates

TAC Laminate with Polyether Block AmideFilm by a Primer-Coated TAC Film

A clear TAC film (Lofo 916) was coated with the Primer #5 primer formulation. The coated TAC film was then UV cured to obtain a primer-coated TAC film. The coated TAC film was laminated with a polyether block amide (Pebax) photochromic film supplied by Transition Inc. by roll lamination at 15 psi using a two-component polyurethane adhesive (U09 FL, supplied by Loctite Inc.). The laminate was then cured at room temperature for 24 hours. The resulting photochromic lamiante displayed excellent adhesion between the TAC and polyether block amide interface. Peel force was measured by Mark 10 equipment with a value above 18 N/inch. Therefore the TAC film is considered to exhibit very good adhesion to the Pebax film.

In a comparative control example, the TAC and polyether block amide films above were laminated using the same two-component polyurethane adhesive under the same laminating conditions. No primer was used in this control example. The resulting laminate displayed poor adhesion with a peel force of about 5 N/inch. The adhesive strength was also inconsistent across different TAC film types. This experiment demonstrates that a crosslinking component may be added to a primer for increasing the intra-layer adhesive strength within a film laminate.

The claims are not to be interpreted as including means-plus- or step-plus-function limitations, unless such a limitation is explicitly recited in a given claim using the phrase(s) "means for" or "step for," respectively.

The invention claimed is:

1. A method for adhering a cellulose triacetate (TAC) film or a cellulose triacetate (TAC) laminate to a polymerizable material for preparing an ophthalmic lens and for reducing or eliminating the potential for delamination in said ophthalmic lens, comprising:
providing a primer, said primer resulting from a primer composition comprising:
10-30% by weight of the primer composition of at least one methacrylate copolymer;
10-30% by weight of the primer composition of at least one functional urethane acrylic oligomer;
1-25% by weight of the primer composition of at least one crosslinking agent;
1-5% by weight of the primer composition of at least one UV or thermal initiator;
50-90% by weight of the primer composition of a solvent;
wherein the thickness of said primer ranges from about 1 μm to about 4 μm and the hardness of said primer ranges from 9B to 6B by pencil hardness test;
coating the primer on the TAC film or the TAC film laminate; and
casting the coated TAC film or a TAC laminate with the polymerizable material;
wherein the polymerizable material is an allyl diglycol carbonate;
wherein the crosslinking agent in the primer composition is pentaerythritol triacrylate; and
wherein the TAC film is a clear optical film or an optical functional film.

2. The method according to claim 1, wherein the crosslinking agent in the primer composition comprises at least two reactive functional groups independently selected from the group consisting of acrylic, acrylate, allyl, vinyl, propargyl, isocyanate, amine, and epoxy.

3. The method according to claim 1, wherein the methacrylate copolymer in the primer composition contains an acid number from 10 to 80 in the copolymer.

4. The method according to claim 1, wherein the TAC laminate is a TAC-PVA-TAC polarizing laminate.

5. The method according to claim 1, wherein the solvent in the primer composition is at least one of a ketone solvent, an acetate solvent, a methylene chloride solvent, or a combination thereof.

* * * * *